(12) United States Patent
Jepsen et al.

(10) Patent No.: US 11,931,925 B2
(45) Date of Patent: *Mar. 19, 2024

(54) METHOD AND AN APPARATUS FOR MAKING A THREE-DIMENSIONAL OBJECT AND A MEMBRANE THEREFORE

(71) Applicant: Adapa A/S, Aalborg (DK)

(72) Inventors: Christian Raun Jepsen, Aalborg (DK); Stasys Montvydas, Aalborg (DK); Jakob Filsø, Aalborg (DK)

(73) Assignee: ADAPA APS, Aalborg (DK)

( * ) Notice: Subject to any disclaimer, the term of this patent is extended or adjusted under 35 U.S.C. 154(b) by 187 days.

This patent is subject to a terminal disclaimer.

(21) Appl. No.: 17/221,979

(22) Filed: Apr. 5, 2021

(65) Prior Publication Data

US 2021/0221031 A1    Jul. 22, 2021

Related U.S. Application Data

(63) Continuation of application No. 16/082,731, filed as application No. PCT/EP2017/055162 on Mar. 6, 2017, now Pat. No. 10,987,832.

(30) Foreign Application Priority Data

Mar. 8, 2016    (EP) .................................... 16159171

(51) Int. Cl.
    *B29C 33/40*    (2006.01)
    *B29C 33/00*    (2006.01)
    (Continued)

(52) U.S. Cl.
CPC .......... *B29C 33/405* (2013.01); *B29C 33/308* (2013.01); *B29C 33/32* (2013.01); *B29C 33/3842* (2013.01); *B29C 67/0011* (2013.01); *H01F 7/0231* (2013.01); *B29C 33/0011* (2013.01); *B29K 2875/00* (2013.01); *B29K 2883/00* (2013.01); *B29K 2995/007* (2013.01)

(58) Field of Classification Search
CPC ..... B29C 33/405; B29C 33/308; B29C 33/32; B29C 33/3842; B29C 67/0011; B29C 33/0011; H01F 7/0231; B29K 2875/00; B29K 2883/00; B29K 2995/007
See application file for complete search history.

(56) References Cited

U.S. PATENT DOCUMENTS

| 5,851,563 A | 12/1998 | Hoffman |
| 7,462,321 B2 | 12/2008 | Udin |

(Continued)

FOREIGN PATENT DOCUMENTS

| WO | 2005089189 A2 | 9/2005 |
| WO | 2012065614 A1 | 5/2012 |

(Continued)

*Primary Examiner* — S. Behrooz Ghorishi
(74) *Attorney, Agent, or Firm* — Dinsmore & Shohl LLP (57) ABSTRACT

An apparatus for making a three-dimensionally curved object, said apparatus comprising a membrane having a moulding surface, which is configurable into a predetermined shape by individually adjusting an array of actuators acting on the surface opposite the moulding surface of said membrane, wherein the membrane is a ferromagnetic membrane and the actuators are provided with magnetic joints at the distal ends of said actuators.

20 Claims, 6 Drawing Sheets

(51) Int. Cl.
    *B29C 33/30*     (2006.01)
    *B29C 33/32*     (2006.01)
    *B29C 33/38*     (2006.01)
    *B29C 67/00*     (2017.01)
    *H01F 7/02*     (2006.01)

(56) References Cited

U.S. PATENT DOCUMENTS

| | | | |
|---|---|---|---|
| 7,972,129 | B2 | 7/2011 | O'Donoghue |
| 10,987,832 | B2 * | 4/2021 | Jepsen ................ B29C 67/0011 |
| 2005/0064148 | A1 * | 3/2005 | Udin ...................... B29C 70/42 |
| | | | 428/174 |
| 2005/0211870 | A1 * | 9/2005 | Browne ............... B29C 33/308 |
| | | | 249/134 |
| 2011/0085949 | A1 * | 4/2011 | Roy ....................... B29C 59/02 |
| | | | 264/237 |
| 2014/0116002 | A1 * | 5/2014 | Denny ................... B32B 33/00 |
| | | | 53/329.2 |
| 2014/0175703 | A1 * | 6/2014 | Percival, Jr. ............ B29C 53/04 |
| | | | 264/316 |

FOREIGN PATENT DOCUMENTS

| | | |
|---|---|---|
| WO | 2012143887 A1 | 10/2012 |
| WO | 2014138759 A1 | 9/2014 |

\* cited by examiner

METHOD AND AN APPARATUS FOR MAKING A THREE-DIMENSIONAL OBJECT AND A MEMBRANE THEREFORE

CROSS-REFERENCE TO RELATED APPLICATIONS

This application is a Continuation Application of U.S. application Ser. No. 16/082,731, filed Sep. 6, 2018, which is the U.S. national stage of PCT/EP2017/055162 filed Mar. 6, 2017, which claims priority of European Patent Application 16159171.4 filed Mar. 8, 2016; each of which is hereby incorporated by reference in its entirety.

FIELD OF INVENTION

The present invention relates to a method and an apparatus for making a three-dimensionally curved object, said apparatus comprising a membrane having a moulding surface, which is configurable into a predetermined shape by individually adjusting an array of actuators acting on the surface opposite the moulding surface of said membrane. Another aspect of the present invention relates to a membrane for such apparatus.

BACKGROUND OF THE INVENTION

Three-dimensional moulds for making an object with double-curved surfaces are known from e.g. WO 2014/138759 or WO 2012/065614.

From U.S. Pat. No. 7,972,129 a moulding system is known with a backing mould made of a polymer with metal powder therein for improving heat transmission through the mould plate during moulding. These metals are copper or aluminium added as fillers to the polymer to aid the heat transmission.

In U.S. Pat. No. 7,462,321, an apparatus for forming a three-dimensionally curved sheet material is known. The membrane therein may be provided with suction openings to control the curvature of the membrane. Furthermore, the membrane is provided with a skeleton formed by a rectangular grid of battens.

The membrane forms the moulding surface in the double-curved moulding apparatus. In order to achieve the three-dimensional curvatures, i.e. the double curved shape of the moulded object, it is important that the membrane exhibits flexibility. This is achieved to a large degree in the known three-dimensional moulding apparatuses mentioned above, but there is nevertheless a need for improving the flexibility for thereby expanding the field of use of this type of moulding apparatuses.

SUMMARY OF THE INVENTION

Accordingly, it is an object of the present invention to provide an improvement of such apparatus and the method of moulding a three-dimensional object using such moulding apparatus.

In a first aspect of the invention, this object is achieved by a membrane for making a three-dimensionally curved object by a mould, wherein the membrane provides a reconfigurable double curved moulding surface, which is configured into a predetermined shape by individually adjusting an array of actuators acting on the surface opposite the moulding surface of said membrane, wherein the membrane is composed of a mixture of rubber material and magnetic powder, such as ferromagnetic powder.

By providing a flexible membrane with magnetic properties, it is by the invention realised that a magnetic coupling of the membrane to the actuator array may be used. This is advantageous since the joints while holding the membrane may be allowed to slide on the holding surface of the membrane without losing grip. This provides for the possibility of achieving more extreme curvatures of the object to be moulded by a mould with a membrane according to the invention.

In some preferred embodiment of the ferromagnetic membrane, the mixture comprises a ratio of 10-80% by volume of the magnetic powder, preferably 30-50% and more preferably approx. 40%, and a ratio of 20-90% by volume of rubber material. Hereby, the magnetic force required for holding the membrane can be selected according to the user requirements by using a sufficiently high amount of ferromagnetic powder, as well as the flexibility and stretching forces that the membrane can withstand can be accustomed.

In the currently preferred embodiments of the magnetic membrane, the magnetic powder has a granulate size of less than 200 µm (i.e. mesh 70 or smaller). The magnetic powder is preferably iron powder, such as ferromagnetic granulate and/or based on granulates comprising magnetic alloys. In the mixture, the rubber material is preferably a silicone or polyurethane rubber, but could also be other types of rubber material.

By the invention, it is found advantageous that the membrane is provided with a Shore A hardness of within the range of 10-75, preferably 30-40. In order to avoid magnet marks, such as small indentations in the holding surface of the membrane caused by the magnetic joints, it is found advantageous to produce a magnetic membrane with a Shore A hardness above 30 A, preferably above 35 A.

In a preferred embodiment, a top layer is provided on the side with the moulding surface of the magnetic membrane. Hereby it may be ensured that a predetermined moulding surface can be achieved. The surface texture may in a preferred embodiment be a smooth surface but it is realised that other surface textures could be provided in accordance with the object to be moulded.

In order to enhance the sliding properties between the magnetic joints and the membrane, an external friction-reducing coating is advantageously provided at least on the side of the membrane opposite the moulding surface of the membrane, said coating preferably being polytetrafluoroethylene (PTFE) or similar material.

In order to increase the membrane stiffness, reinforcement rods may be provided in tubes embedded in the mixture of the membrane. In a preferred embodiment, wherein the reinforcement rods are provided spaced apart and in two directions, said directions preferably being substantially perpendicular to each other, and preferably the planes in which said two directions of rods are provided are spaced apart. Hereby, the bending stiffness of the membrane is homogeneous.

The reinforcement rods are preferably composite rods, such as carbon fibre rods. This material is advantageous since carbon fibre rods are flexible and with a high tensile strength. However by the invention it is realised that the rods may be produced in other materials, such as steel or other metals.

By the invention, it is realised the rods and the associated tubes are provided with matching cross-sectional shapes, such as with a circular or square cross-sectional shape.

Preferably, the rods are slidably mounted in the tube and the rods are preferably provided with a stop at one end of each rod. Hereby, the reinforcement of the membrane is achieved without compromising the flexibility of the membrane.

In a second aspect of the invention, this object is achieved by an apparatus for making a three-dimensionally curved object, said apparatus comprising a membrane having a moulding surface, which is configurable into a predetermined shape by individually adjusting an array of actuators acting on the surface opposite the moulding surface of said membrane, wherein the membrane is a ferromagnetic membrane and the actuators are acting on a magnetic joint system provided with magnetic joints which is holding the ferromagnetic membrane.

The magnetic joints are preferably able to slide on the surface of the magnetic membrane while being connected to the membrane. This provides for a large degree of flexibility of the membrane so that three-dimensional shape with extreme curvature may be achieved.

In an embodiment of the invention, the magnetic joints preferably comprise electro-magnets, which can be selectively switched on or off either collectively or individually on each of the actuators.

Hereby, a further degree of flexibility in which geometrical shapes the membrane may be manipulated into.

In a third aspect of the invention, this object is achieved by a method for making a three-dimensionally curved object using an apparatus according to the second aspect with the magnetic membrane according to the first aspect, said method comprising the steps of:

providing a mould with a moulding surface defined by the magnetic membrane on an array of individually adjustable actuators with a magnetic joint system, magnetically holding the membrane by magnetic joints of said magnetic joint system, selectively manipulating the membrane into a predetermined three-dimensional shape by adjusting the lengths of the actuators in the array.

As mentioned above, it is advantageous that at least some of the magnetic gripping joints are sliding on the membrane surface opposite the moulding surface while holding the membrane during the manipulation and the moulding process.

BRIEF DESCRIPTION OF THE DRAWINGS

In the following, the invention is described in more detail with reference to examples and the accompanying drawings, in which.

DETAILED DESCRIPTION OF THE PREFERRED EMBODIMENTS

Figure 1:
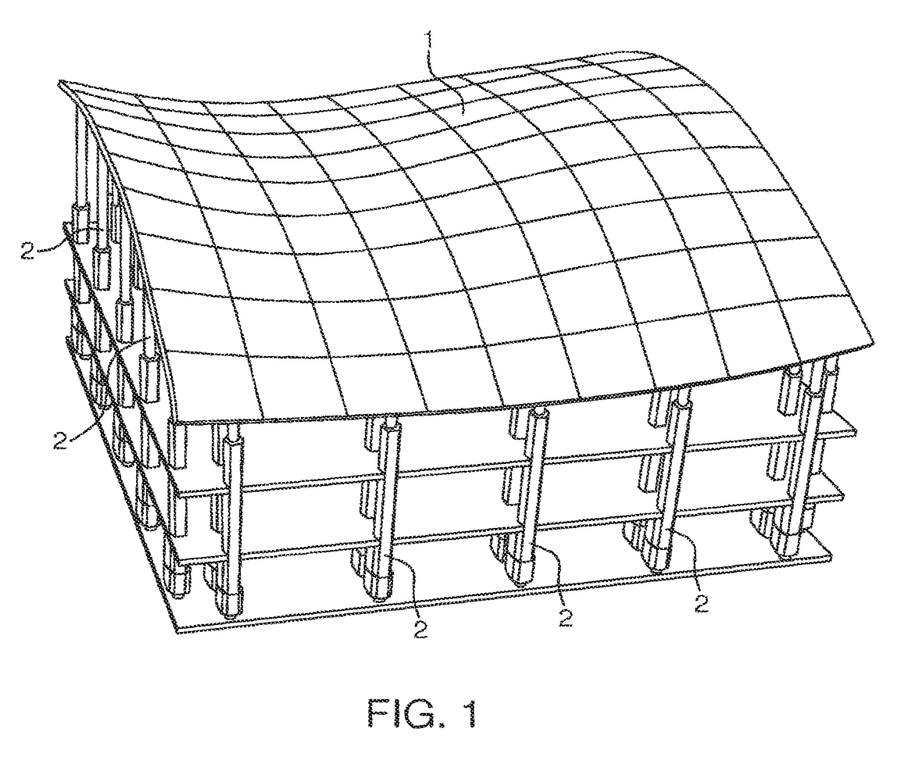
FIG. 1 is a schematic perspective view of a moulding tool for making a three-dimensional object.

With reference to FIG. 1, an apparatus for moulding a three-dimensional object is shown. This moulding apparatus may be used as one part of a double-sided moulding tool. The apparatus comprises a flexible membrane 1 which is provided supported by an array of actuators 2. The actuators 2 are provided with a predefined direction. This direction may be individual for each of the actuators or group of actuators, or as shown in the embodiment of FIG. 1, with the same orientation of all the actuators 2. In the shown embodiment, this orientation is generally perpendicular to the membrane 1, such as in a vertical orientation. The actuators 2 are individually adjustable in lengths, and the membrane 1 may thereby be deflected into a curved shape, such as a single-curved or double-curved shape, i.e. a three-dimensional shape as shown in FIG. 1. The actuators 2 are linear actuators and are in control connection to a control system (not shown) for setting the individual lengths of the actuators according to a predetermined membrane shape.

Figure 4:
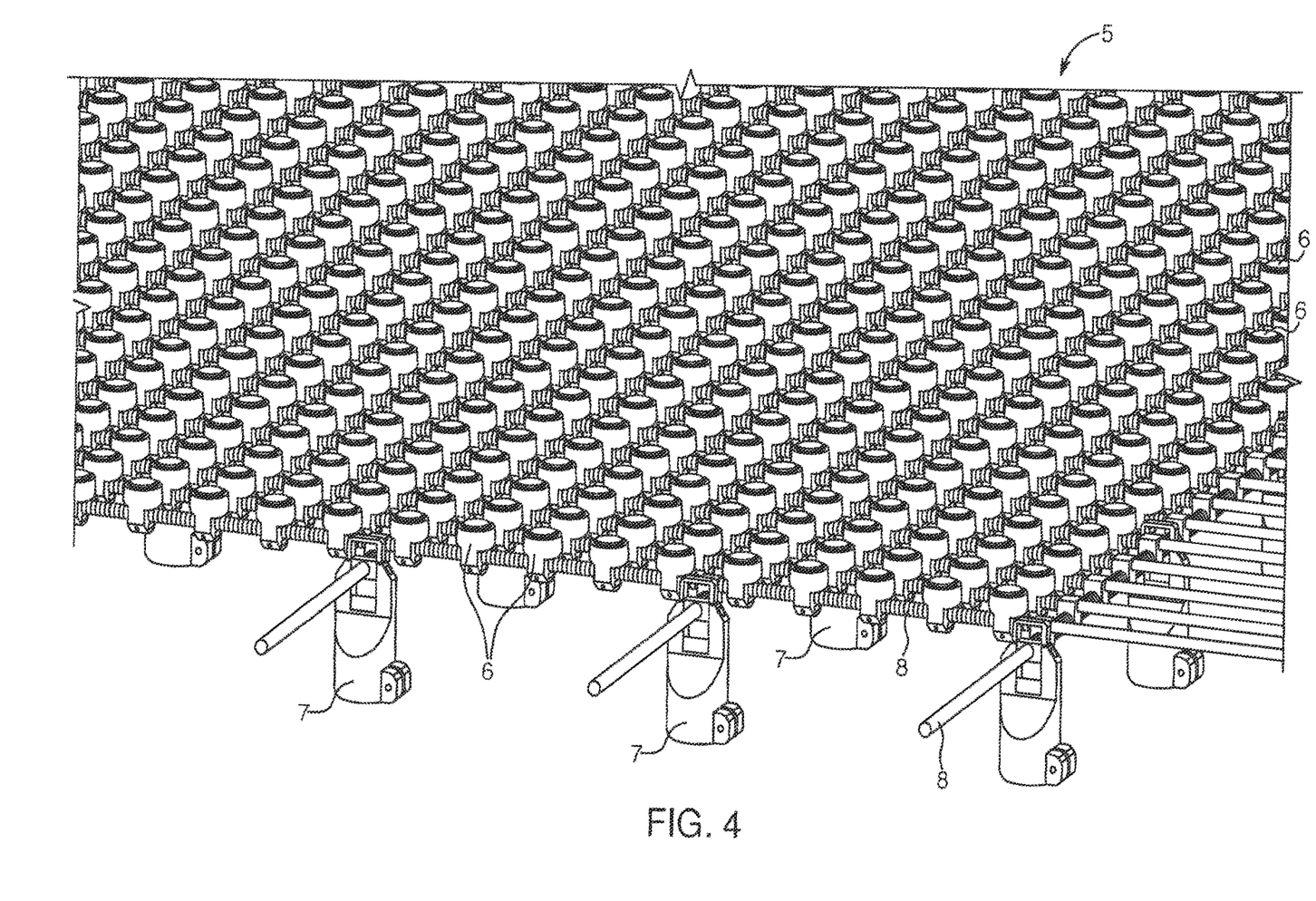
FIG. 4 is a schematic perspective view of the magnetic joint system without the membrane.
Figure 5:
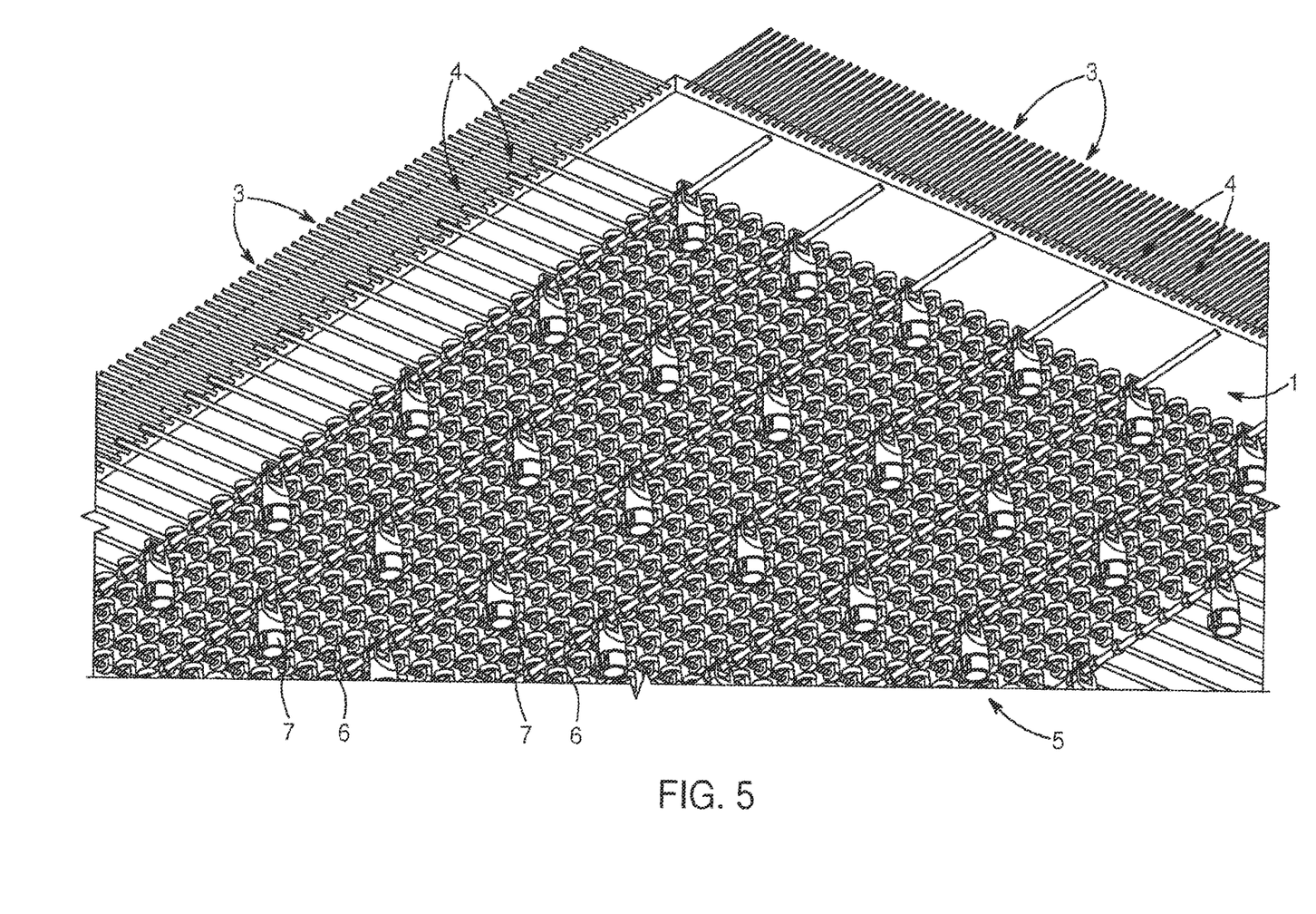
FIG. 5 is a schematic perspective view from below of the magnetic joint system with the membrane according to an embodiment of the invention.
Figure 6:
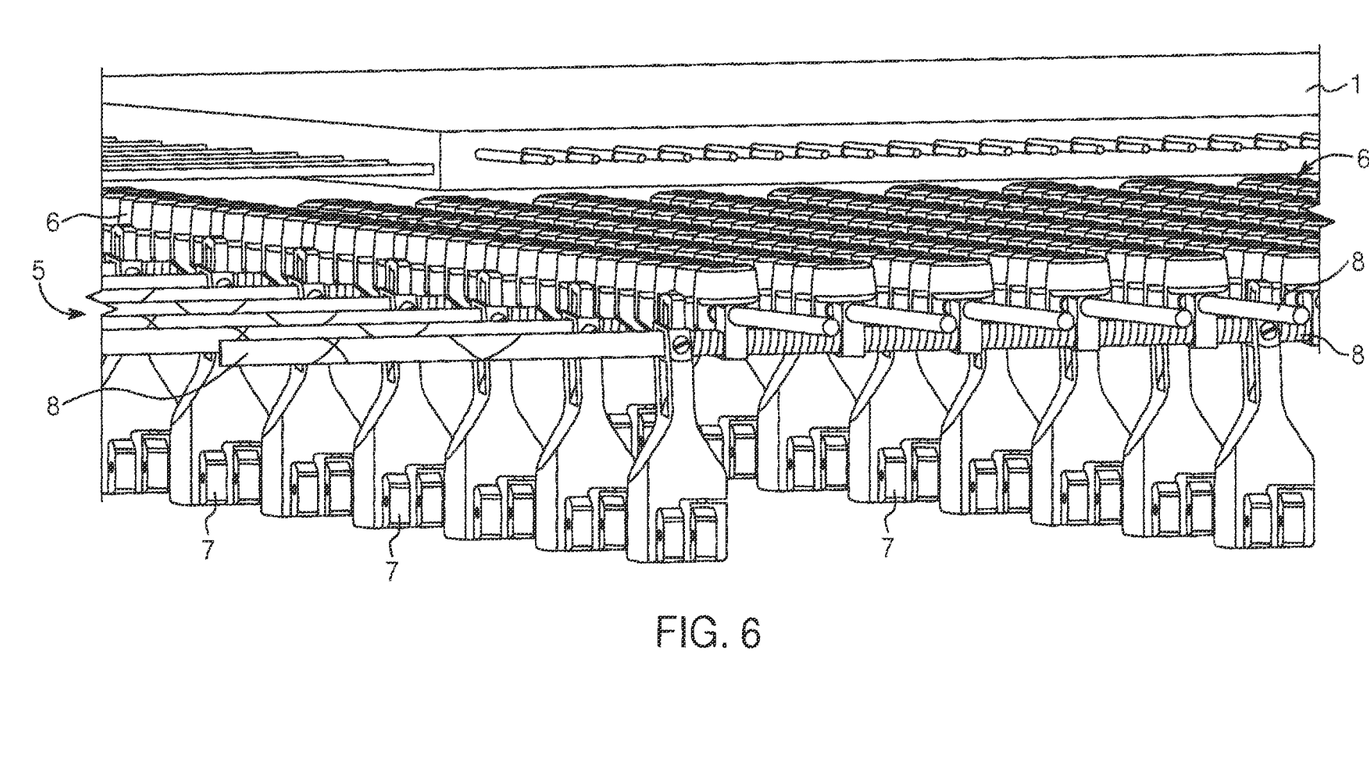
FIG. 6 is a detailed view of the magnetic joint system with the membrane of FIG. 5 suspended above it.

Rather than fixing the distal ends of the actuators 2 to the underside of the membrane 1 as it is the case in the moulding tool disclosed in e.g. WO 2012/065614, the membrane 1 by the present invention is made ferromagnetic and the distal ends of the actuators 2 are provided with a magnetic joint system 5, which is shown in more detail in the FIGS. 4 to 6. This allows for the joints holding the membrane 1 to slide on the holding surface (the not visible underside in the embodiment in FIG. 1).

Figure 2:
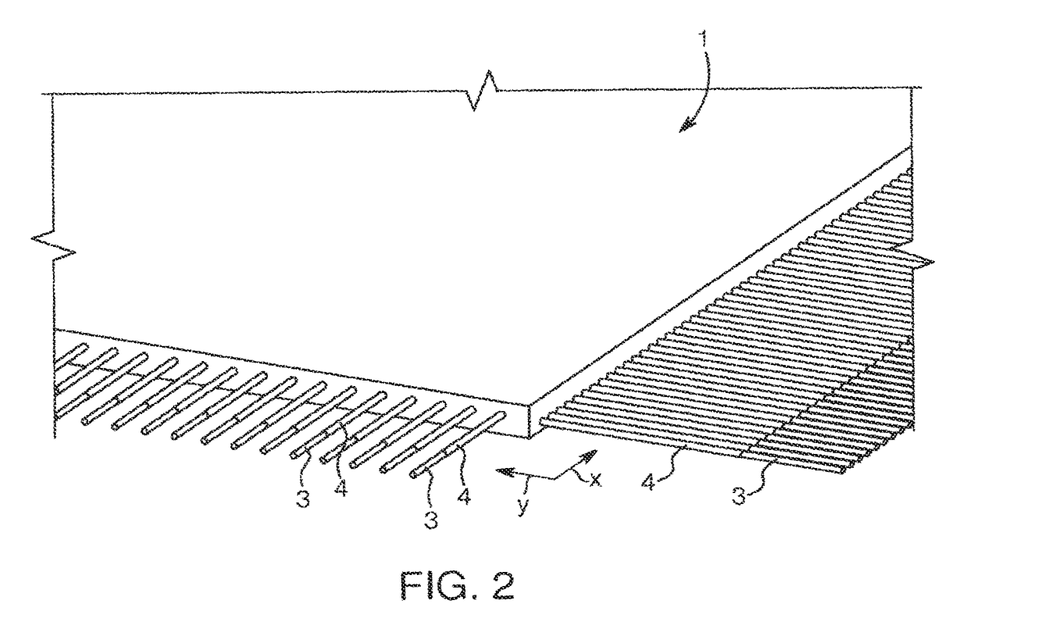
FIG. 2 is a schematic perspective view of a membrane according to an embodiment of the invention
Figure 3:
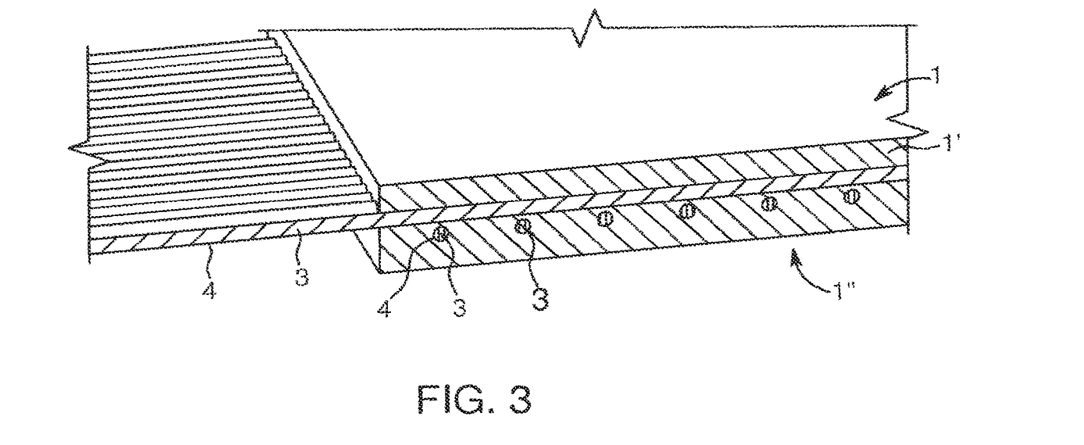
FIG. 3 is a detailed cross-section view of the membrane of FIG. 2.

The membrane 1 is cast in an iron powder/rubber mixture. In FIGS. 2 and 3, a ferromagnetic membrane according to a preferred embodiment of the invention is shown. In this embodiment, carbon rods 3 are spaced with 15 mm gaps and two directions intersect with substantially perpendicular angle to each other (see for instance FIG. 2). The carbon rods 3 in the different directions are provided with a small spacing in between then in order for the structure of the membrane 1 to tie in together. This allows rubber mixture to fill the small gaps and produce a uniform connection between carbon fibre rod structures during the membrane casting. The carbon rods 3 are provided in tubes 4. The tubes 4 that accommodate carbon fibre rods 3 provide flexibility in compression and tension of the whole membrane 1, which otherwise would be restricted by carbon rods 3 inability to extend and compress relative to the rubber matrix of the membrane 1. As shown in FIG. 3, the membrane 1 may be provided with a top layer 1' which serves the purpose of providing a smooth or otherwise predetermined moulding surface of the membrane 1. Likewise the membrane 1 may also be provided with a friction-reducing surface layer 1" on the membrane side opposite the moulding surface 1'. This friction-reduced surface may preferably be in the form of a polytetrafluoroethylene (PFTE) layer. Hereby, it is facilitated that the magnetic holding joints can slide relative to the membrane 1 whilst holding the membrane 1 in a predetermined shape or indeed during the deformation of the membrane 1 into a predetermined shape.

The magnetic joint system 5 is shown in FIGS. 4 to 6. The magnetic joint system 5 is provided as an array of magnets 6, arranged in rows on a grid of flexible magnet support rods 8. The magnets 6 face the membrane 1 (see FIGS. 5 and 6) and hold the membrane 1 by magnetic force. At the crosspoints of the flexible magnet support rods 8 actuator receiving members 7 are provided in which the actuators 2 (not shown in FIGS. 4 to 6). As it is apparent in the FIGS. 4 to 6, the amount of magnets 6 may be chosen independent of the amount of actuators 2 in the array.

In the following, the manufacturing of the ferromagnetic membrane is described by way example:

Example 1

A membrane was produced in a casting using a mixture with a 40%/60% ratio by volume, i.e. 40% iron powder and 60% rubber. The casting was made in two pouring operations. First layer was premixed with Shore 35 A hardness rubber and corresponding iron powder ratio inside and poured in the casting mould. This is done in order to achieve a uniform layer of rubber upon which carbon fibre rod mesh could be assembled. After rubber reached (and solidified in) its tacky/gel stage tubes 4 with carbon fibre rods 3 were provided with 15 mm spacing both directions (x and y directions). Then the second batch of rubber was premixed and poured into a casting mould.

Example 2

In another example in casting a membrane 1 the membrane 1 is provided with stiffer surface characteristics that were caused by stiffer 3 mm diameter carbon rods 3. The overall rod mesh increased the stiffness of the membrane 1 without causing significant marks on the casting surface when the membrane is shaped to a (double-) curved geometry. The magnetic force acting on the membrane was seen to be sufficient to account for increased stiffness in the membrane and only in extreme cases is not able to hold on to certain complex curvature parts of the membrane.

Example 3

A membrane 1 produced as in example 2 was externally coated with low friction flexible coating 1". A test of the coating revealed, it has a significant impact on the membrane slip characteristics when in contact with the magnet surface. It was found that the coating 1" will reduce friction forces between membrane 1 and magnets 6 (see FIGS. 4 to 6) greatly and thus provide enough flexibility for the system 5 to operate with even better consistency and accuracy. By reducing friction forces it is found that the membrane 1 will slide, stretch and contract easier while in shaping the membrane 1 into the predetermined double-curved shape. And in turn this will assist the magnets 6 to maintain better connection with the membrane 1 in extreme curvature scenarios.

In FIGS. 4 to 6, a magnetic joint system and membrane is shown. The figures provide an illustration of how magnetic joint system 5 and membrane 1 interact with each other while on flat state. This system 5 provide the ability to have the magnetic joint system and the membrane 1 connected only by using magnetic force provided by the magnet mesh.

In the examples, the top surface 1' of the membrane 1 was also provided with a glossy finish. This is caused by the natural curing parameters of the rubber. Without this top coating, the top surface of the membrane could have an unsmooth surface caused by high viscosity of the rubber while casting. Even the applied vibration with rotary pneumatic vibration wheels would not appear sufficient to evenly distribute the rubber.

Testing the Membrane

In the membranes 1 in accordance with the examples, the carbon fibre rods 3 inside the membrane as well as the tubes 4 around the rods 3 were found to function very well. The sliding of the rods 3 inside the tubes 4 is very good and unobstructed in any way.

The membrane was then attached to the magnetic joint layout and put into shapes. After a several extreme curvature shaping scenarios it was noticed that magnet joints push at the membrane quite strongly and marks can be seen at the other side. In extreme curvature cases magnets loose connection with the membrane as stretching forces become too hard and magnets cannot hold it anymore. And lastly in regards to external evaluation, the membrane seemed to be too flexible and thus pose a threat of deforming too easily in such extreme casting scenarios.

According to observations on this first test, further tests were conducted and it was found that:

A harder shore rubber could be used in the mixture in order to eliminate magnet marks on the moulding surface. A test of a membrane with a hardness of Shore 35 A instead of Shore 30 A was successfully tested.

A larger ratio of iron powder in the casting mixture would overcome the drawback in extreme curvature scenarios where the magnetic forces were not powerful enough to hold the membrane in some more extreme cases.

The use of a stronger vibration system during the casting of the membrane can overcome the issues of achieving an evenly distributed top layer. The vibration system provides an increase in the energy supplied in the liquid rubber and thus increasing energy of the particles. This allows particles to impact with each other with more energy and thus self-distribute, just as trapped air bubbles are removed as the vibration system provides a de-gassing from the casting.

In order to increase the membrane stiffness, larger diameter carbon fibre rods may be used. As an example 3 mm diameter rods may be used instead of 2 mm rods. However, it is also realised that other cross-sectional shapes of the rods 3 and the accommodating tubes 4 may be used.

Tests Relating to Magnetic Properties to Shore a Hardness

Tests were prepared comparing iron powder ratios and rubber Shore hardness scenarios for the membrane. The following membrane samples were prepared and casted:

Sample A: Shore 30 A hardness rubber and 30% iron/70% rubber mixture.

Sample B: Shore 30 A hardness rubber and 40% iron/60% rubber mixture.

Sample C: Shore 30 A hardness rubber and 50% iron/50% rubber mixture.

Sample D: Shore 40 A hardness rubber and 40% iron/60% rubber mixture.

The following results were observed:

Sample A:

It is the exact same mixture and hardness ratio as the membrane of example 1. It will be used to compare other castings in relation to existing prototype.

Sample B:

There was observed a slight increase in hardness and a notable increase in magnetic power. While the casting is still too soft it possesses the magnetic attraction force that might be sufficient in holding the membrane in extreme scenarios. Although it does not account for increased rod diameter and thus increased force.

Sample C:

This sample possesses notable increase in hardness which can be compared with shore hardness's equivalent to shore 40-50 A. A significant increase in magnetic attraction force is observed. The power of the casting is around 20-30% higher compared with original cast of sample A (example 1). This casting of sample C gives promising results in regards to magnetic attraction force and hardness ratio, although a disadvantage could be increased viscosity and problematic flow characteristics.

Sample D:

In sample D there was found a significant increase in hardness compared to original casting and a slight increase in magnetic attraction forces. Although a warping of the cast was observed while curing. A further analysis would be required to find the reason of warping. However, all to all it might be a promising solution to solve the problems in initial casting.

So far in regard to current observations from castings of the samples A to D, it is concluded that 50/50 ratio mixture shows most useful as it produces a significantly larger magnetic attraction force and because of the increased percentage of iron powder inside it presents an increased shore hardness to the casting. Although 40/60 ratio castings (samples B and D) can be used as they also have increased magnetic forces and increased hardness and have better flow characteristics. The conclusion can be made that 50/50 ratio casting which is made from shore 35 A rubber would be a good solution.

Figure 7:
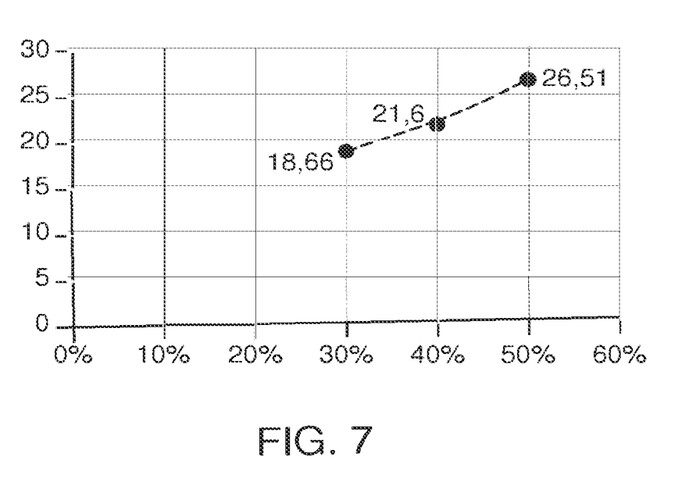
FIG. 7 is a diagram showing the pull force required to remove the magnet from the membrane as a function of the ferromagnetic powder volume ratio in the mixture of the magnetic membrane according to the invention.

A simple setup was made in order to measure the pull force required to remove the magnet from the membrane castings. Results are shown in FIG. 7 and in table 1 below referring to iron powder ratio in the casting (by volume) and the force (in Newton) required to separate a magnet from the ferromagnetic membrane cast.

TABLE 1

| x (ratio) | y(Force/N) |
|-----------|------------|
| 30%       | 18.66      |
| 40%       | 21.6       |
| 50%       | 26.51      |

By the invention it is realised that moulding components or the like may be magnetically joint to both the top and the bottom surface of the membrane. This and other variations may be provided without departing from the scope of the invention as defined in the accompanying claims.

The invention claimed is:

1. A membrane for making a three-dimensionally curved object by a mould, wherein the membrane provides a reconfigurable double curved moulding surface, wherein the membrane is composed of a mixture of rubber material and magnetic powder, wherein the mixture comprises a ratio of 10-80% by volume of the magnetic powder and a ratio of 20-90% by volume of rubber material, the membrane being moved into a predetermined shape by individually adjusting an array of mechanical actuators each having a distal end magnetically connected to a surface of the membrane opposite the moulding surface.

2. The membrane of claim 1, wherein the mixture comprises a ratio of by volume of the magnetic powder, or approx. 40% by volume of the magnetic powder.

3. The membrane of claim 1, wherein the magnetic powder has a granulate size of less than 200 μm.

4. The membrane of claim 1, wherein the magnetic powder is a ferromagnetic powder.

5. The membrane of claim 1, wherein the rubber material is a silicone or polyurethane rubber.

6. The membrane of claim 1, wherein the membrane is provided with a Shore A hardness of within the range of 20-50.

7. The membrane of claim 1, wherein the membrane is provided with a Shore A hardness of within the range of 30-40.

8. The membrane of claim 1, wherein a top layer is provided on the moulding surface of the membrane.

9. The membrane of claim 1, wherein an external friction-reducing coating is provided at least on the surface of the membrane opposite the moulding surface of the membrane.

10. The membrane of claim 9, wherein said coating is polytetrafluoroethylene (PTFE) or similar material.

11. The membrane of claim 1, wherein reinforcement rods are provided in tubes embedded in the mixture of the membrane.

12. The membrane of claim 11, wherein the reinforcement rods are provided spaced apart and in at least two directions.

13. The membrane of claim 12, wherein said directions are substantially perpendicular to each other, and/or wherein said two directions of rods are provided in different planes.

14. The membrane of claim 13, wherein the planes are spaced apart.

15. The membrane of claim 11, wherein the reinforcement rods are composite rods.

16. The membrane of claim 15, wherein the reinforcement rods are carbon fibre rods.

17. The membrane of claim 11, wherein the reinforcement rods and the associated tubes are provided with matching cross-sectional shapes.

18. The membrane of claim 17, wherein the matching cross-sectional shapes are circular shapes, square cross-sectional shapes, or some combination thereof.

19. The membrane of claim 11, wherein the reinforcement rods are slidably mounted in the tubes.

20. The membrane of claim 11, wherein the reinforcement rods are each provided with a stop at one end.

* * * * *